Jan. 29, 1963 C. W. ATTWOOD 3,075,621
WALL PANEL AND PROCESS OF ASSEMBLING SAME
Filed Sept. 23, 1960 3 Sheets-Sheet 1
FIG.I.
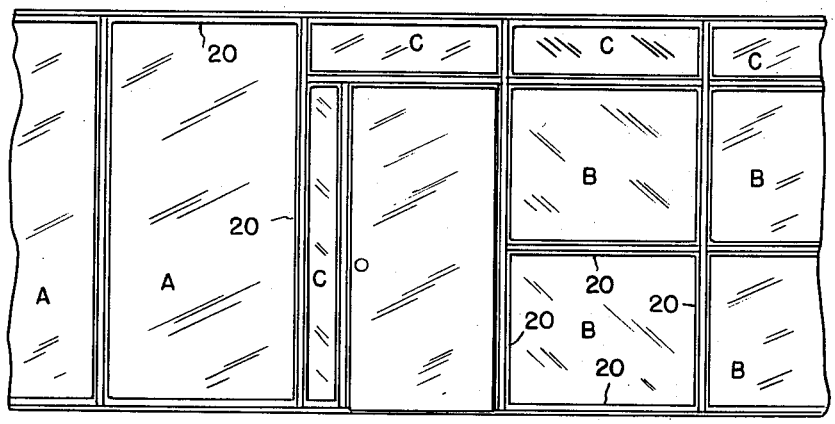
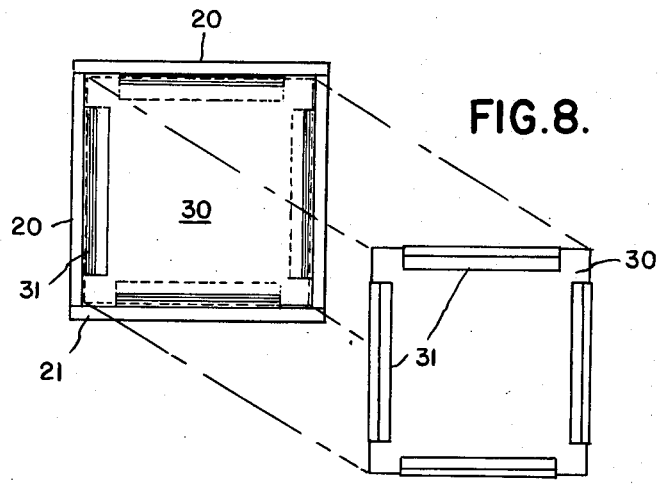
FIG.8.
INVENTOR.
CHARLES W. ATTWOOD
ATTORNEYS Jan. 29, 1963 C. W. ATTWOOD 3,075,621
WALL PANEL AND PROCESS OF ASSEMBLING SAME
Filed Sept. 23, 1960 3 Sheets-Sheet 2
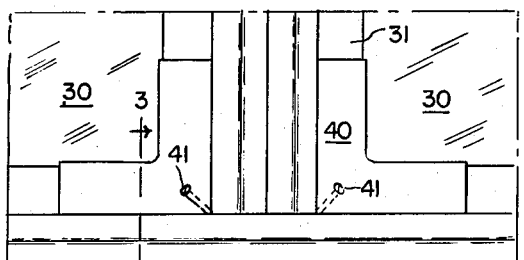
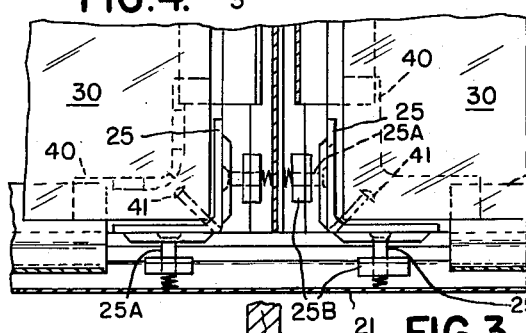
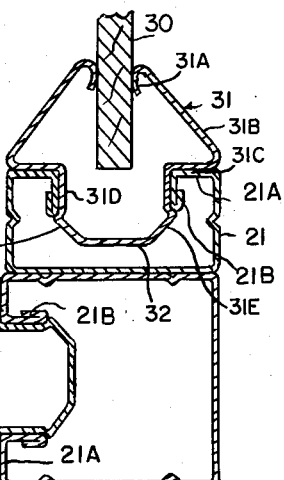
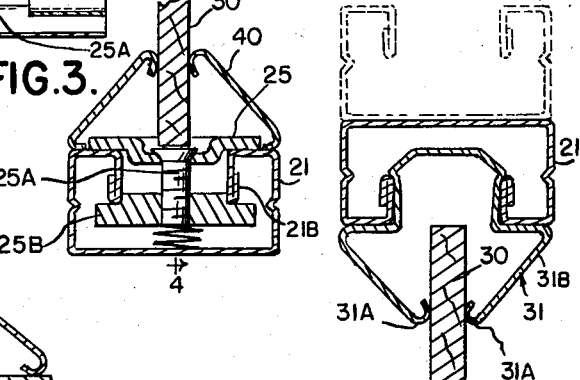
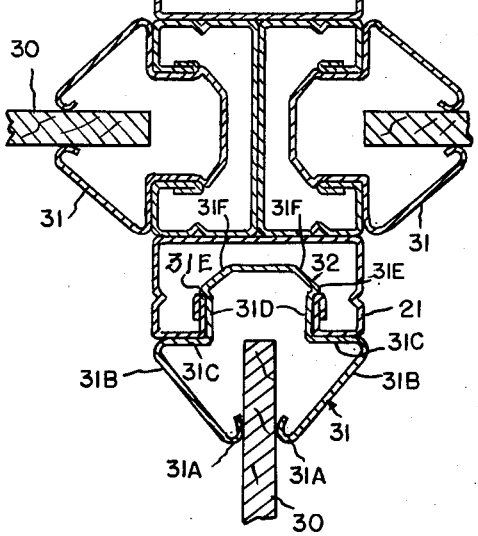
*INVENTOR.*
CHARLES W. ATTWOOD
ATTORNEYS Jan. 29, 1963  C. W. ATTWOOD  3,075,621
WALL PANEL AND PROCESS OF ASSEMBLING SAME
Filed Sept. 23, 1960  3 Sheets-Sheet 3

INVENTOR.
CHARLES W. ATTWOOD
BY
ATTORNEYS

United States Patent Office 3,075,621
Patented Jan. 29, 1963

3,075,621
WALL PANEL AND PROCESS OF
ASSEMBLING SAME
Charles W. Attwood, 4077 2nd St., Wayne, Mich.
Filed Sept. 23, 1960, Ser. No. 58,878
10 Claims. (Cl. 189—34)

This is a continuation in part of my copending application, Serial No. 428,357, filed May 7, 1954, now abandoned.

The invention relates to construction of building walls, partitions, space dividers and the like and more particularly to an improved structural system embodying readily assembled and demountable panels of pre-fabricated materials such as plywood, metal, glass, fiberboard and plastic.

The present system is adapted most readily to incorporation in the new space-frame construction system I have developed as described in my copending patent application Serial No. 57,874, filed September 20, 1960, which is a continuation-in-part of my copending application Serial No. 481,748, filed January 14, 1955, now abandoned, and as analyzed in the two-volume work by Paul H. Coy, entitled Structural Analysis of "Unistrut" Space-Frame Roofs, The University of Michigan Press, 1959.

In the development of buildings using the aforesaid construction system, emphasis is laid on architectural variety and economy achieved through a standardized system of lightweight, interchangeable and completely salvageable parts of high quality and dimensional accuracy that can be assembled at minimum cost. The system forms buildings varying greatly in size and design and which are capable of being readily altered to meet changing needs.

The present panel construction is intended to further these basic principles and emphasis here is laid on simplicity of construction and assembly as well as adaptation to varying requirements.

Another valued asset in the aforesaid framing system is its capacity to support large stress loads and withstand the forces of wind, earth-shock and fatigue producing vibrations. This quality is due to an inherent structural resilience and flexibility of the building as a complete integrated unit.

With the above in mind, it will be apparent that wall panels, partitions and the like can not be rigidly secured to the framing system, but must be allowed a certain degree of slippage. In fact, it has been found that panels rigidly secured to my type of space frame will eventually crack as the frame undergoes stresses in various directions. The present panels, although securely held in place, are permitted this required slippage.

An object of the present invention is to further architectural variety in building construction by providing readily varied space dividing walls, partitions and the like.

Another object of the invention is to simplify the assembly and disassembly of panels in a construction system by providing readily installed panel supporting frame elements.

A further object of the invention is to adapt panel constructions to an inherently resilient and flexible space-frame system by providing a new universal supporting element which holds panels of varying thicknesses securely to the basic framing units and yet permits relative movement between panels, frame and other building components.

Yet another object of the invention is to provide for ease of construction and maintenance of buildings by providing a new simplified panel supporting element which is readily installed and which serves as a smooth contoured molding at the edges of the panels.

A still further object of the invention is to reduce costs and time of assembling panels in a construction system by providing a new panel supporting element which may be readily and rapidly installed without special tools, fasteners or equipment.

For a more complete understanding of the invention, reference may be had to the accompanying drawings illustrating preferred embodiments of the invention in which like reference characters refer to like parts throughout the several views and in which:

FIG. 1 is a view in elevation of a preferred partition or wall embodying the present invention.

FIG. 2 is an enlargement of a portion of FIG. 1 showing a panel corner.

FIG. 3 is a cross-sectional view taken substantially on line 3—3 of FIG. 2.

FIG. 4 is a view like FIG. 2 but with channels shown in section to illustrate interior construction.

FIG. 5 is a cross-sectional view taken substantially on the line 5—5 of FIG. 2.

FIG. 6 is a similar section but showing a corner construction.

FIG. 7 is a similar section but showing intersecting portions.

FIG. 8 is a view illustrating the method of installing a panel.

Figure 10:
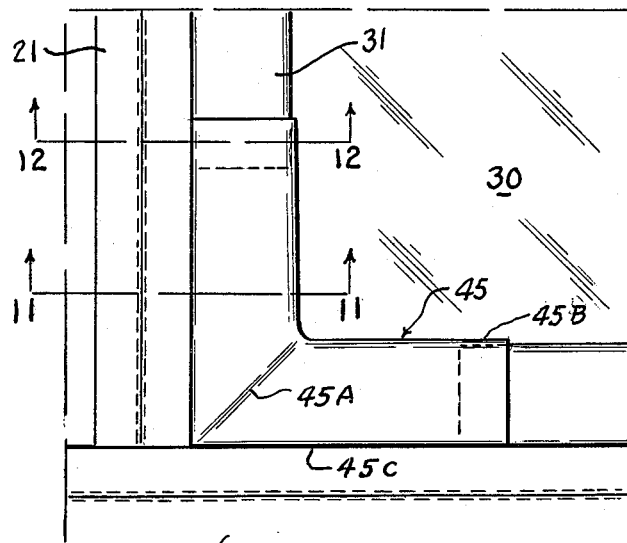
FIG. 10 is a fragmentary plan view of a panel corner embodying a modified corner element.
Figure 11:
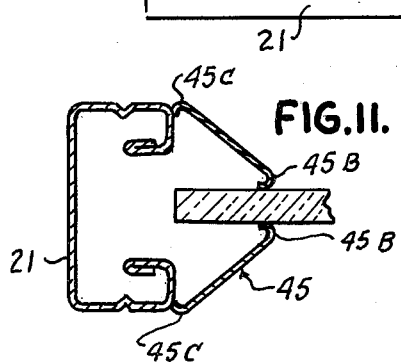
FIG. 11 is a cross-sectional view taken on the line 11—11 of FIG. 10.

As indicated in the drawings, the invention is particularly valuable for walls and partitions and is applicable to panels of many different sizes and shapes. In FIG. 1, for example, there are shown at A full length panels of substantial width extending from floor to ceiling. At B are shown approximately square panels, considerably less than from floor to ceiling, and at C, long narrow panels.

In producing a wall or partition adapted for use with my space-frame system, a framework 20 of suitable channel members 21 is first fixed in place to provide the sizes of openings desired to be panelled and with the channel slots of the members 21 opening inwardly, i.e. in the plane of the panels.

As indicated, the channel members 21 are each preferably of a rectangular metallic section having channel walls 21A turned in, and then down, as at 21B, to provide a longitudinal slot of less width than the channel and with inturned flanges. (The channeled material just described is known in commerce as "Unistrut," but the invention is not limited to such material as other channeled material may be used.)

In providing the framework 20 above mentioned, the several channel members 21 constituting top, bottom and sides of a panel are preferably connected together by means of an angle member 25 shown in FIGS. 3 and 4. This is held in place by means of a bolt or screw 25A coacting with the nut 25B in turn coacting with the flanges 21B. These angle members 25, if used, will serve a plurality of purposes as will appear later.

After the framework has been completed, a square or rectangular piece of the panel material—of wood, metal, glass, plastic or other material—cut to fit approximately a particular opening in the frame, such a piece being indicated in FIGS. 2, 3 and 8 at 30, or may be pre-cut to approximate size at the factory. Upon the four edges of this panel are placed molding members 31, shown in section in FIGS. 5, 6 and 7, these being less in length than the edges of the panel 30. In FIG. 8, the lower portion of the figure shows such a panel 30 with the moldings applied in the initial position.

Each of the moldings 31 is of comparatively thin spring metal and as shown in FIGS. 5, 6, 7 and 9 is substantially U-shaped with the free edges 31A reverse-bent and sufficiently close together to grip any size of panel 30 inserted between them. The side walls of the U are formed outwardly to provide beads 31B diverging from the edges 31A to provide a shoulder 31C at the other side of the bead, the overall width of the molding including the beads being substantially the same as the width of the channel member 21. The base portion 32 of the U is provided with substantially straight side walls 31D separated from each other such a distance that this portion of the molding below the shoulders 31C will fit snugly in the slot of the member 21. In order to fit tightly, these side walls 31D are so formed that in final position, they tend to slant outwardly from the surfaces 31C, and are preferably provided with a slight bulge or rib 31E on the side so that the molding may be snapped into the channel slot and these retained against being readily dislodged. Also, it is noted that the base portion 32 has inclined portions 31F which permit the inturned sides of the channel slot to compress the base portion sides together on insertion of the molding in the channel slot, allowing the beads 31E to pass by the channel slot and snap outwardly under the channel slot edges.

When the moldings are initially applied as in FIG. 8 (lower part) the edges of the panel 30 will be at the bottom of the U of the molding. The assembly is then placed in the frame of channeled material, and the moldings 31 are hammered outwardly, preferably with rubber mallet, so that the portion 32 is forced into the channel slots. The forcing of the moldings 31 into the channel slots causes the rolled edges 31A to exert pressure on the panels 30, holding them quite firmly in place.

The upper left portion of FIG. 8 is a view in elevation of the frame with the panel in position.

The four angle plates 25 coacting with the corners of the panels position the latter in the frames and prevent them from moving into the channel slots. When the panels have been installed as described, corner fill pieces 40 are used to complete the assembly. These, as shown in the modification of FIGS. 2 and 4, may consist of right angled members extending from a corner of the frame to overlap the adjacent ends of the molding and are fixed in place to the frame only by means of screws 41 extending into tapped holes in the members 25.

Figure 12:
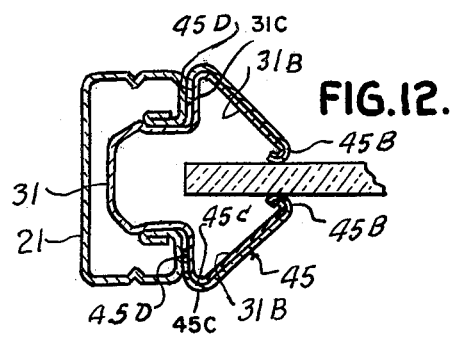
FIG. 12 is a cross-sectional view as taken on the line 12—12 of FIG. 10.
Figure 13:
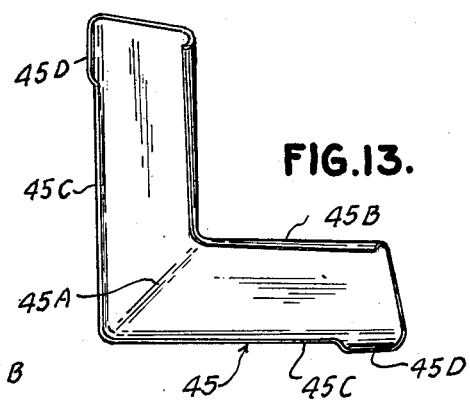
FIG. 13 is a perspective rear view of the modified corner element of FIG. 10.
Figure 9:
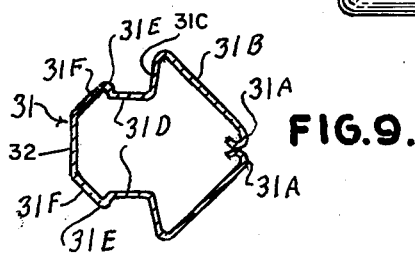
FIG. 9 is a cross-sectional view of a molding member as initially formed.

In FIGS. 10 through 13, a modified structure is shown in which the panels 30 are supported in the channel members 21 by the same moldings 31, but different corner elements 45 are used. These preferably are squared off at the inner corner and have a diagonal corner line 45A, which design is preferred by architects. No screw is needed, however, since both the inner edge 45B and the outer edge 45C are rolled over to more readily secure the corner element to the molding, and the ends of the outer edge 45C are each provided with tab extensions 45D which are readily forced in under the molding shoulder 31C as shown in FIG. 12.

The corner elements 45 are readily snapped in place by hand and will not tend to pop out when pressures are exerted on the other side of the panel. This is achieved through the greater area of frictional engagement provided by the tabs 45D. This tab is so arranged that it does not hit the ends of an angle fitting if such as used. It will be noted, however, that with this modification there is no need for the angle to provide a securing point for the corner element as in the modification of FIGS. 2 through 4.

FIGS. 5, 6 and 7 illustrate how the invention is used in various parts of a wall installation. For example, FIG. 5 illustrates the use of two channel members 21 secured back to back, one holding a panel 30 while the other may be used for any purpose such as for hanging a door.

FIG. 6 shows a large and a small channel secured together so as to provide for a wall corner.

FIG. 7 illustrates an arrangement of four channel members arranged for the intersection of walls.

It will be seen that the panels 30 are not rigidly secured to any part of the frame structure 20. They are permitted limited slippage with respect to the channel members 21 which themselves may be flexed when the building as a whole is subjected to the stresses and strains of ground heaving, structural loading, vibrations, earth tremors, high wind loads and the like. Yet, due to the secure clamping action of the molding members 31 as retained in the channels 21, the panels will not rattle or be otherwise loosely retained. Moreover, simplicity of installation and 100% salvageability of parts makes for highly economical use, re-use, and alterability of building interiors. Also, the form of the moldings 31 provides a clean panelled appearance on both sides, the moldings blending into both channel members 21 and panels 30. Yet, it will be noted that since all edges of the panels 30 are enclosed, accurate or smooth edge finishing is not required.

There are only a few basic parts used; namely, channels 21, panels 30, moldings 31, and incidental angles and bolts, all of which are capable of being economically mass-produced due to the high degree of standardization provided.

The moldings can accommodate many thicknesses of panels, from relatively thin glass to thicker multiply insulating panels.

Although I have described only a few embodiments of my invention, it will be apparent to one skilled in the art to which the invention pertains that various changes and modifications may be made therein without departing from the spirit of the invention or the scope of the appended claims.

I claim:

1. A panel assembly comprising
   (a) a plurality of channel members secured together to form a framework defining a planar opening,
   (b) a panel member similar in shape to said opening,
   (c) longitudinal molding members connecting the edges of said panel member to said channel members,
   (d) each of said channel members having its side walls turned inwardly to provide a longitudinal slot, said slots facing inwardly of said opening and adapted to receive said molding members,
   (e) said molding members each comprising a U-shaped base portion having side webs spaced to fit into the slot of said channel member and including locking means engageable under the edges of said channel side walls, and a base web connecting said side webs,
   (f) the edges of said panel being initially inserted between the side webs and abutting the base webs of said molding member base portion, the dimensions of said panel plus the base web thicknesses being slightly less than the dimensions of said opening
   (g) whereby said panel with said molding members on the edges may be laterally inserted into the preformed framework, following which said base portions are moved outwardly into said slots and said locking means are engaged under the edges of said channel side walls.

2. The panel assembly as defined in claim 1 and in which the side webs extend outwardly of said framing member slots and embrace the surfaces of said panel adjacent the edges thereof.

3. The panel assembly as defined in claim 2 and in which said side webs have portions extending laterally in opposite directions and return-bent at an inclined angle toward said panel with the edges engaging said panel.

4. The panel assembly as defined in claim 3 and in which said laterally extending portions form shoulders seated on the side walls of said framing members.

5. The panel assembly as defined in claim 4 and in which the outer lateral dimension between said laterally extending portions is substantially the same as the lateral dimension of the framing member.

6. The panel assembly as defined in claim 2 and in which said molding member is formed of resilient sheet metal and said side wabs are resiliently urged toward opposite sides of said panel.

7. The panel assembly as defined in claim 1 and in which said locking means comprise laterally outwardly extending beads at the junctures of the side webs with said base web.

8. The panel assembly as defined in claim 1 and including
   (a) bracket elements connecting said framing members,
   (b) said bracket elements having means disposed in the plane of said panel and providing stops preventing said panel from moving with said molding members into said slots.

9. The panel assembly as defined in claim 1 and including
   (a) corner elements adapted for assembly at the juncture of said framing members following assembly of the molding members therewith,
   (b) said corner elements comprising angle strips having their ends overlying the ends of said molding members and secured thereto to prevent removal of said molding members from the framing members.

10. The panel assembly as defined in claim 1 and in which
    (a) said framework comprises vertical and horizontal channel members defining a rectangular planar opening, and
    (b) said panel width and height are each respectively less than the width and height of said opening by an amount at least as great as twice the thickness of said base web.

References Cited in the file of this patent
UNITED STATES PATENTS

| | | |
|---|---|---|
| 1,380,372 | Forsyth | June 7, 1921 |
| 2,622,710 | Haas | Dec. 23, 1952 |